L. F. DOUGLASS.
METHOD OF AND APPARATUS FOR PRODUCING STEREOSCOPIC PHOTOGRAPHIC FILMS.
APPLICATION FILED JULY 14, 1919.

1,429,495.

Patented Sept. 19, 1922.
2 SHEETS—SHEET 1.

Inventor
Leon F. Douglass
By Strong & Townsend
ATTORNEYS

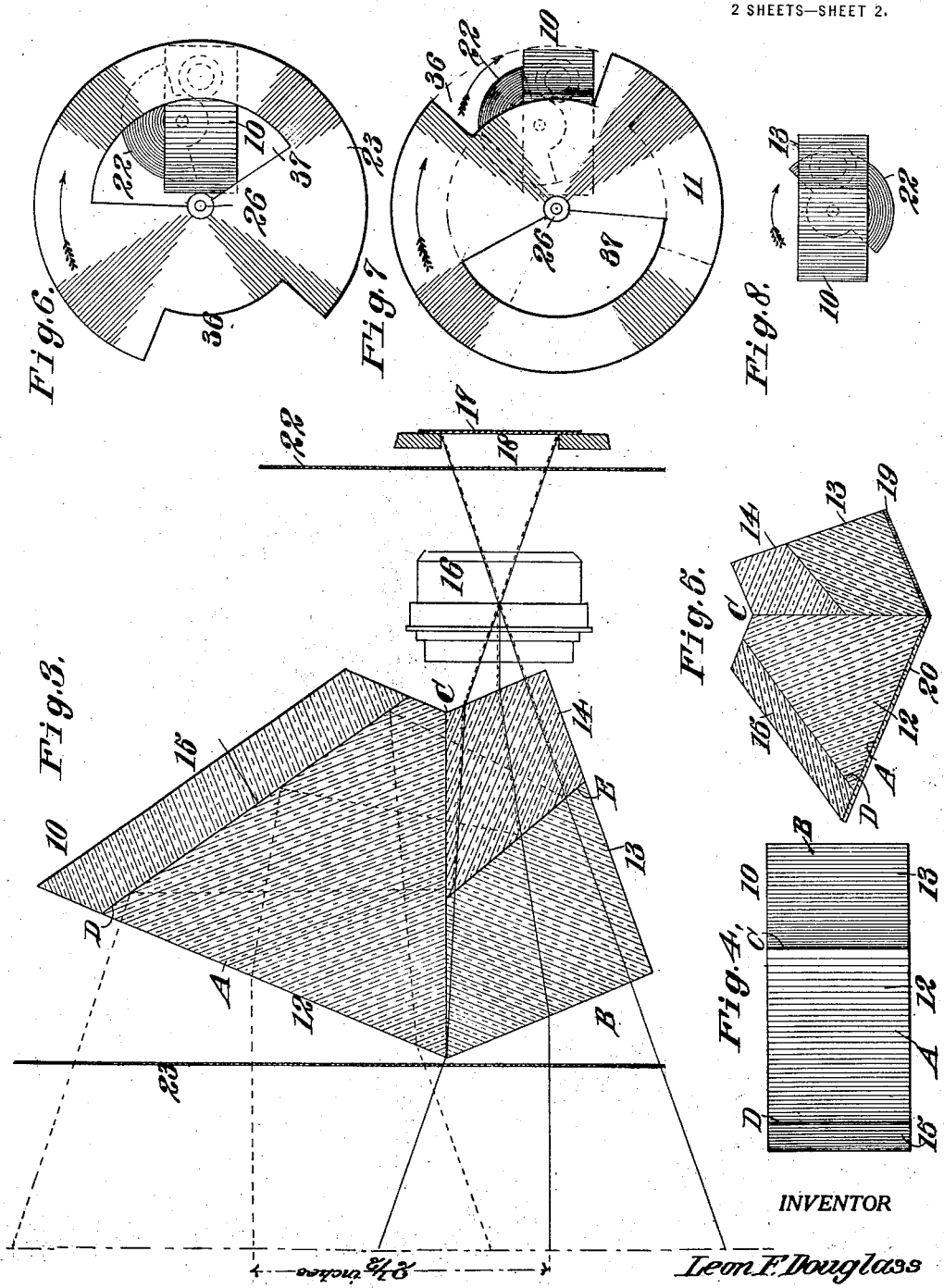

Patented Sept. 19, 1922.

1,429,495

UNITED STATES PATENT OFFICE.

LEON FORREST DOUGLASS, OF SAN RAFAEL, CALIFORNIA.

METHOD OF AND APPARATUS FOR PRODUCING STEREOSCOPIC PHOTOGRAPHIC FILMS.

Application filed July 14, 1919. Serial No. 310,738.

*To all whom it may concern:*

Be it known that I, LEON F. DOUGLASS, a citizen of the United States, residing at San Rafael, in the county of Marin and State of California, have invented new and useful Improvements in Methods of and Apparatus for Producing Stereoscopic Photographic Films, of which the following is a specification.

This invention relates to a method of producing stereoscopic photographic films and is particularly directed to a process of making motion picture films, having a series of consecutively exposed views thereon which when passed through the ordinary motion picture projection machine will produce a continuous stereoscopic motion picture upon an exhibition screen.

It is the principal object of the present invention to provide an apparatus for producing a pair or set of photographic images, which, when properly combined and viewed, under projection, for instance, will show a true stereoscopic effect. It is common knowledge that to produce a stereoscopic effect, it is necessary to take two photographs of the same object, each photograph being taken from a different point of view. These points of view are usually spaced apart a distance approximating that between the eyes. These two individual pictures, when properly combined and viewed will give body and depth to the resultant photographic image, and thereby produce the desired stereoscopic effect. Motion picture photography is peculiarly adapted for this class of work as a film is provided upon which a series of consecutively exposed views may be alternately taken from one or two view points. The exposures made from the two stations will correspond to the individual field of vision of each eye and, although, the views are consecutively exposed when the pictures are taken, the interval of time between exposures is so small that when the film is projected the persistence of vision of the observer will be such as to give the effect of a single stereoscopic image at rest in motion.

The present invention is particularly concerned with an apparatus adapted to be fitted upon the ordinary motion picture camera, taking pictures in colors or otherwise, and embodying the use of prism unit through which the alternate images may be taken, said unit being fitted with a shutter mechanism operating in synchronism with the shutter usually provided upon the camera and thus alternately admitting a beam of light through the ordinary camera lens to the film as emanating from the image in two of its aspects, and thereby eliminating the use of two separately arranged lenses as commonly used in the taking of stereoscopic photographs.

The invention is illustrated by way of example in the accompanying drawings, in which—

Fig. 3 is an enlarged view in plan disclosing the relation between the stereoscopic prism unit, the photographic lens and the film and further diagrammatically indicating the path of the light rays through said lens and prism combination.

Fig. 4 is a view in side elevation disclosing the stereoscopic prism unit.

Fig. 5 is a view in plan, further illustrating the stereoscopic prism unit and its opposite construction and filter screens.

Fig. 6 is a view showing a shutter mechanism as drawn upon a reduced scale and more clearly disclosing the co-operative relation of the photographic lens shutter.

Fig. 7 is a view showing the various shutters when they have passed through one-half of the cycle operation.

Fig. 8 is a view showing the photographic shutter as disassociated from the camera and further disclosing its relation to the photographic prism combination of the main stereoscopic lens.

Figure 1:
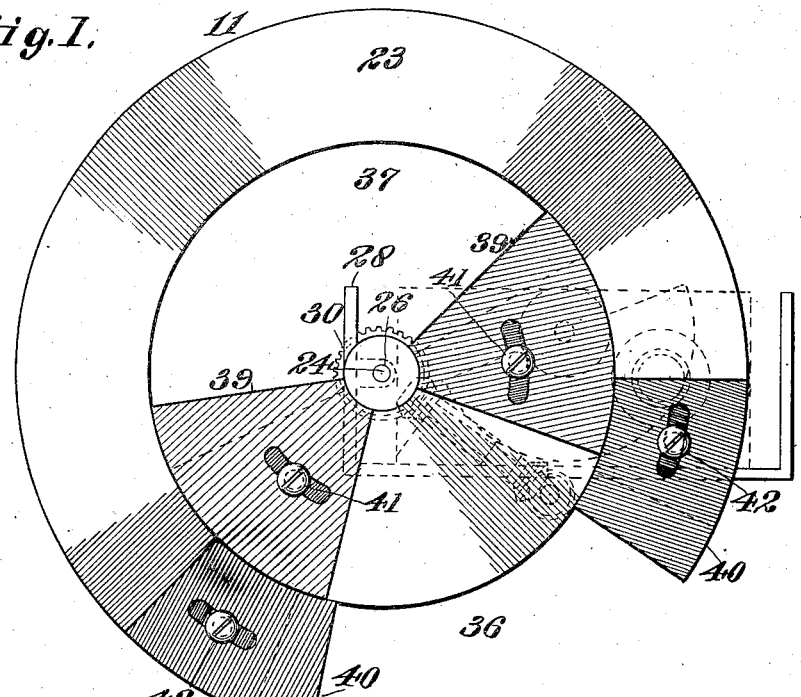
Fig. 1 is a view in front elevation showing the stereoscopic prism shutter mechanism and its relation to the prism and the main shutter of a camera.

Broadly considered, the present invention is concerned with a stereoscopic prism unit 10 and a shutter mechanism 11.

With reference to Figures 3 and 5 of the drawings, it will be seen that the prism unit comprises a large prism whose basal planes are trapezia 12 which is disposed with one of its sides parallel to the central focal plane of a motion picture camera. Another prism 13 and a third prism 14, both of which have trapezia for basal planes lie against this side of prism 12. The opposite side of prism 12 is covered by a flat prism 15, the opposite sides of which are parallel, and whose end faces form continuations of the end faces of prism 12. Prisms 13 and 14 may be fastened to prism 12 along the line C by means of Canada balsam or may be held in juxtaposition to each other by any desired securing means. It will be evident by reference to Fig. 3 that the prisms 12 and 13 are provided with planes of incidence, as indicated at A and B, respectively, and that these planes are at equal angles to the central focal plane of the lens unit as represented by the line C. The lens or glass 15 will combine with the face of the prism 12 to form an interface D, from which the light rays will be reflected from the prism 12 to an interface E formed between the incidence prism 13 and the reflecting prism 14, thus causing both of the pyramids of light which pass through or into the prisms 12 and 13 to be reflected through the prism 14 to a photographic lens 16. As before stated, this lens is one of common construction and in use upon the photographic camera and it has been found by experience that with the present structure, desirable results may be obtained by the use of a Bausch and Lomb—Zeiss—Tessar 48 M.M. lens. The two light pyramids are thereafter projected upon a photographic film 17, which is intermittently exposed before a suitable light opening 18 in the camera.

The purpose of the prism combination or unit as previously described is to receive two separate and individual fields of vision corresponding to the two fields of vision received individually by the two normally placed and functioning eyes of a person when viewing a certain object or combination of objects, after which the two pyramids of light may be refracted and reflected so that they emerge from the prism combination to be received by a lens to form images at the focus of the lens, each image corresponding to the image of the combined objects in each of the fields of vision. When a film is used, the prism combination must be so constructed that the two resulting images will be absolutely coincident, save for the difference, of course, in the relative location of the objects in the fields of vision, due to the original difference between the two view points. By absolute coincidence of image is meant that each image shall have the same exact scale and shall be identical in all other respects, save for the difference in registration of the two images of the same specific object due to the difference in distance between the two view points. Other than this the images should register with each other and be in mutually superimposed precision and agreement. That is, the images should not only be stereoscopic isomorphs dimensionally identical but they should occupy the identical place in the photographic field.

In considering the prism combination necessary for producing these results, it is well to bear in mind that various media have different definite absorption values in relation to light, and that these values are dependent upon the character and thickness of the media. It may be further stated that when a light ray is incident upon the plane surface of a refracting medium, a certain proportion of it may be reflected from the surface, while the remainder enters the refracting medium. when the ray of light incident to the plane surface of the refracting medium is at an angle of ninety degrees to the plane surface all of the light rays passes into the medium. When the ray is incident at or less than the critical angle for the medium, all of it is reflected and none of it enters the medium. The proportion of light reflected varies directly therefore, with the angle of incidence from a maximum value at the critical angle or less to a minimum value when the angle of incidence is zero degrees. It must be, therefore, borne in mind that in order to obtain resultant images of equal intensity, the absorption value of the media must be considered, as well as the angles of the prism faces and the refraction and reflection values they represent. These inequalities in intensities of the two final images may be overcome by dimensionally or angularly varying the members of the prism combination with respect to each other, or by the addition of sections of media which will tend to equalize the intensity of the light rays passing through the two prism combinations disposed in the path of travel of the separate pyramids of light rays. This arrangement is shown in Fig. 5, in which 19 represents one medium placed over the front face of the prism 13 and 20 indicates another medium of different density placed over the face of the prism 12.

In the specific case illustrated by the drawings it has been supposed that the Bausch and Lomb lens previously named is used and that two images are to be formed from points of view taken approximately two and one-half inches apart in a line perpendicular to the direction of the two principal rays, which may be assumed to be parallel. It is further supposed that the particular portions of the pyramids of rays necessary to form the desired images shall be such that the diversion of the lens need not exceed 36 degrees. It is also assumed that the prisms are constructed of a medium, such as optical glass having a refractive index $N_d = 1.519$.

Figure 2:
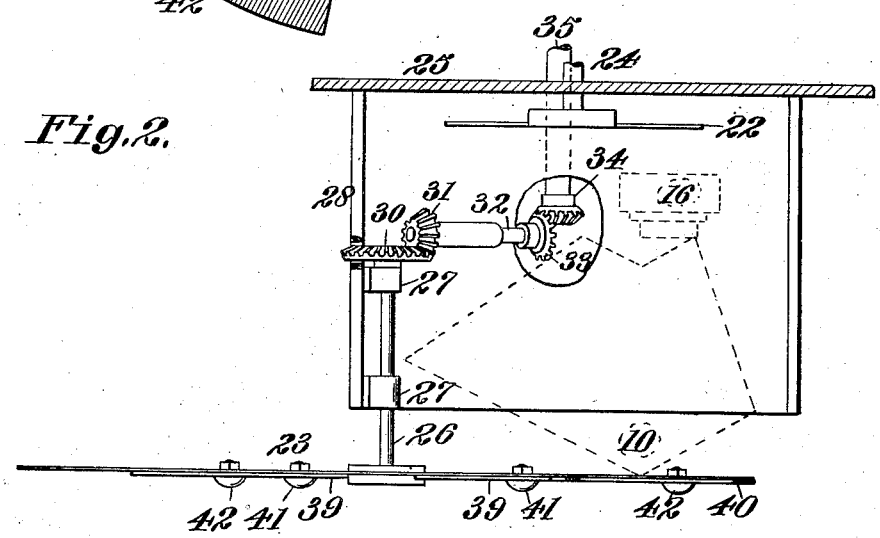
Fig. 2 is a view in plan, showing the various shutters of the camera and the position of the stereoscopic prism combination.

The further mechanism required in taking stereoscopic pictures with the present apparatus consists of the usual rotary photographic shutter as indicated at 22 in Fig. 2 and the additional rotary shutter 23. The shutter 22 is mounted upon a shaft 24 extending through the wall portion 25 of the camera and supporting the shutter in the path of the light rays from the lens 16, as shown in Fig. 3. The shutter 23 is carried upon a shaft 26 which is supported by bearings 27. These bearings are mounted on the side wall of an auxiliary prism case 28, within which the prism structure 10 is carried. Upon the rear end of the shaft 26 is fitted a bevel gear 30. This gear is in constant mesh with a second bevel gear 31, which is carried upon an intermediate drive shaft 32. The opposite end of the shaft 32 is fitted with a bevel pinion 33 in mesh with a complementary pinion 34. The pinion 34 is mounted upon the end of a drive shaft 35, it being understood that this drive shaft is properly connected with the shaft 24 of the shutter 22, so that its rotation will produce simultaneous rotation and concerted action between the two shutters. As shown in Fig. 6 of the drawings, the photographic shutter is represented by a semi-circular plate mounted to rotate around the axis of the shaft 24 and thus to stand in the path of travel of the light rays upon the photographic lens to the photographic film for one-half of its revolution. The auxiliary shutter 23 is substantially circular in section and has two exposure openings 36 and 37. The opening 36 is formed along the circumferential edge of the shutter 23 and is adapted to disclose the receiving face B of the prism 13 at certain points in the cycle of rotation of the shutter. The opening 37 represents the segment of a circle and is described by a shorter radius than the opening 36. This second opening is adapted to disclose the face A of the prism 12 at certain points in the revolution of the shutter. In order to vary the width of the exposure openings and thus selectively determine the interval of exposure adjustable segments 39 and 40 are provided. The segments 39 are carried near the center of the shutter and may be adjusted by screws 41 to vary the dimensions of the opening 37. The plates 40 are adjustably secured to the shutter by means of screws 42 and may be independently moved to vary the length of the opening 36 and at the same time to determine the relative position of this opening with the opening 37.

The shutters 22 and 23 are arranged so that the shutter 22 will intermittently expose the film to the light rays passing from the photographic lens 16 between the periods of motion of the film, and at the same time operate in connection with the shutter 23 so that the prisms 12 and 13 may be alternately exposed to a photographic image in synchronism with such intermittent exposure of the film. In order to accomplish this result it is necessary to disclose the prism 12 to the photographic image while concealing the prism 13, thereafter concealing both of said prisms for a period of time required for moving the film to a position for a second exposure. When the film has been moved to the position for the second exposure, the shutter 22 rotates to an unobstructing position while the shutter 23 rotates to a position with the exposure opening 36 in register with the prism 13. This will permit the image to be photographed upon the film and after which the shutter 23 rotates to conceal both of the prisms while the film is being moved and the photographic lens is being closed by the shutter 22.

In operation of the present invention, it will be assumed that the faces A and B of the stereoscopic prism unit represents two photographic stations, from which pictures are taken of a single image and thus will produce pictures showing two aspects of the same image. For convenience, the station represented by the prism 13 will be designated station No. 1 and the station represented by the prism 12 will be designated station No. 2. It will thus be evident that the pyramids of light rays passing to the station No. 1 will be received by the prism 13 and refracted, at the same time passing through this prism and through the prism 14 after a suitable refraction to the photographic lens 16. This pyramid of light will emerge from the prism 14 and will be received by the lens 16 to form an image at the focus. The pyramid of light passing to station No. 2 will be received by the prism 12 and will be reflected from the face D of this prism to the prism 14. These light rays will enter this prism, and upon striking the interface E, will be reflected through the prism 14, thereafter passing out of this prism to be received by the lens in the order and manner described for the pyramid of light passing to the station 1 and along the same path of travel. It will be understood from the foregoing discussion that the medium may be regulated so that the two sets of light rays passing from the prism 14 to the lens will be of the same intensity, this being done by the character and dimensions of the media or by the use of the screening media 19 and 20.

It will thus be seen by the use of the single prism unit in conjunction with photographic apparatus and particularly motion picture cameras, it will be possible to obtain perfect stereoscopic pictures without the provision of multiple films or reflectors, and the use of a plurality of spaced-lenses or the movement of the camera to different stations for the taking of photographs. The structure here provided is quite simple in its construction and operation and lends itself readily as an attachment to cameras now in use.

While I have shown the preferred form of my invention as now known to me, it will be understood that various changes in the combination, construction and arrangement of parts may be made by those skilled in the art, without departing from the spirit of the invention, as claimed.

Having thus described my invention, what I claim and desire to secure by Letters Patent is:—

1. In a camera with a single objective, a prism combination of glass or other suitable medium to refract and transmit into the objective, in one case, to refract, reflect within itself and transmit into the objective, in the other case, two pyramids of light rays, such as would be received by each of the two normally functionating eyes of a human when vision is focused on a definite set of objects, to cause to be formed at the focus of the objective two distinct and approximately equally intense images in stereoscopic registry and a means of exposing a moving film to each image alternately, to record thereon a series of pairs of images, to produce a stereoscopic motion picture when passed through a motion picture projection machine.

2. In a camera, a means to produce with a single objective, two distinct and separable images of approximately the same intensity, dimensionally equal and in perfect juxtaposition, from two points of vision, the points of vision being taken at points distant from each other an amount corresponding to the distance between the orbital axes of an average human, consisting of a combination of prisms of glass or other suitable medium to properly receive, refract and transmit into the objective on the one hand and receive, refract, reflect and transmit into the objective on the other hand, the two pyramids of light rays necessary for the formation of the two said images at the focus of the objective, and a means of exposing a moving film to both images regularly and alternately to obtain a film with a regular series of registered pairs of stereoscopic images which upon being passed through a motion picture projector will give a continuous stereoscopic motion picture.

3. A prism for producing stereoscopic images comprising a prism block for direct transmission of rays and a reflecting prism block, one of said blocks having its incident face positioned at a right eye viewpoint and the other having its incident face positioned at a left eye viewpoint, and said reflecting prism block having an internal reflecting surface so positioned as to direct its rays upon the emergent face of the other prism block at such an angle as to cause re-reflection of the same in stereoscopic registration with the rays emerging from said direct transmission prism block.

4. A prism for producing stereoscopic images comprising a compound prism block for direct transmission of rays and a reflecting prism block, one of said blocks having its incident face positioned at a right eye viewpoint and the other having its incident face positioned at a left eye viewpoint, said reflecting prism block having an internal reflecting surface so disposed with relation to the meeting faces of the two parts of the compound prism block as to cause reflected rays to be re-reflected in stereoscopic registration with the directly transmitted rays passing through said compound prism block.

In testimony whereof I have hereunto set my hand in the presence of two subscribing witnesses.

LEON FORREST DOUGLASS.

Witnesses:
GWENDOLYN S. COCHRANE,
DOROTHY D. TRABRICCO.